US012563267B1

(12) United States Patent
Jain et al.

(10) Patent No.: US 12,563,267 B1
(45) Date of Patent: Feb. 24, 2026

(54) PERSONALIZED MULTIMODAL ANALYSIS FOR CONTENT ITEM RECOMMENDATION

(71) Applicant: Roku, Inc., San Jose, CA (US)

(72) Inventors: Atishay Jain, San Bruno, CA (US); Fei Xiao, San Jose, CA (US); Abhishek Bambha, Burlingame, CA (US); Rohit Mahto, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/811,434

(22) Filed: Aug. 21, 2024

(51) Int. Cl.
H04N 21/466 (2011.01)

(52) U.S. Cl.
CPC ..... H04N 21/4667 (2013.01); H04N 21/4668 (2013.01)

(58) Field of Classification Search
CPC ........... H04N 21/4667; H04N 21/4668; H04N 21/4826; H04N 21/4532; H04N 21/25891; H04N 21/2668; H04N 21/4755; G06N 20/00; G06N 3/09; G06N 3/044; G06N 3/0464; G06N 3/02
USPC .......................................................... 725/46
See application file for complete search history.

(56) References Cited

U.S. PATENT DOCUMENTS

| | | | | |
|---|---|---|---|---|
| 2021/0274256 A1* | 9/2021 | Kadam | .............. | H04N 21/4532 |
| 2022/0197961 A1* | 6/2022 | Baek | ...................... | G06N 3/045 |
| 2024/0137394 A1* | 4/2024 | Cauteruccio | .......... | H04L 65/613 |
| 2024/0155195 A1* | 5/2024 | Xiao | ................... | H04N 21/4668 |
| 2024/0354641 A1* | 10/2024 | Miller | .................... | G06N 3/045 |
| 2024/0355131 A1* | 10/2024 | Kuppersmith | ........... | G06T 1/60 |

FOREIGN PATENT DOCUMENTS

| | | | | |
|---|---|---|---|---|
| CN | 119003876 A | * 11/2024 | ............. | G06N 20/00 |
| WO | WO-2025173031 A1 | * 8/2025 | | |

* cited by examiner

*Primary Examiner* — Cynthia M Fogg
(74) *Attorney, Agent, or Firm* — STERNE, KESSLER, GOLDSTEIN & FOX P.L.L.C.

(57) ABSTRACT

Disclosed herein are system, apparatus, article-of-manufacture, method and/or computer program product embodiments, and/or combinations/sub-combinations thereof, for personalized multimodal analysis for content item recommendation. An embodiment operates by identifying playback of a first content item by a user device, and simulating playback of a second content item with a modality feature that matches the first content items. Affinity for a modality of the second content item is identified based on weights assigned to the different modalities according to the simulated playback. Respective similarity scores are generated for a plurality of content items based on a similarity between a vector for an embedding indicative of the modality for the second content item and a respective vector for an embedding indicative of the modality generated for the content items. Indication of a set of content items with respective similarity scores that satisfy a similarity score threshold is sent to the user device.

20 Claims, 7 Drawing Sheets

200

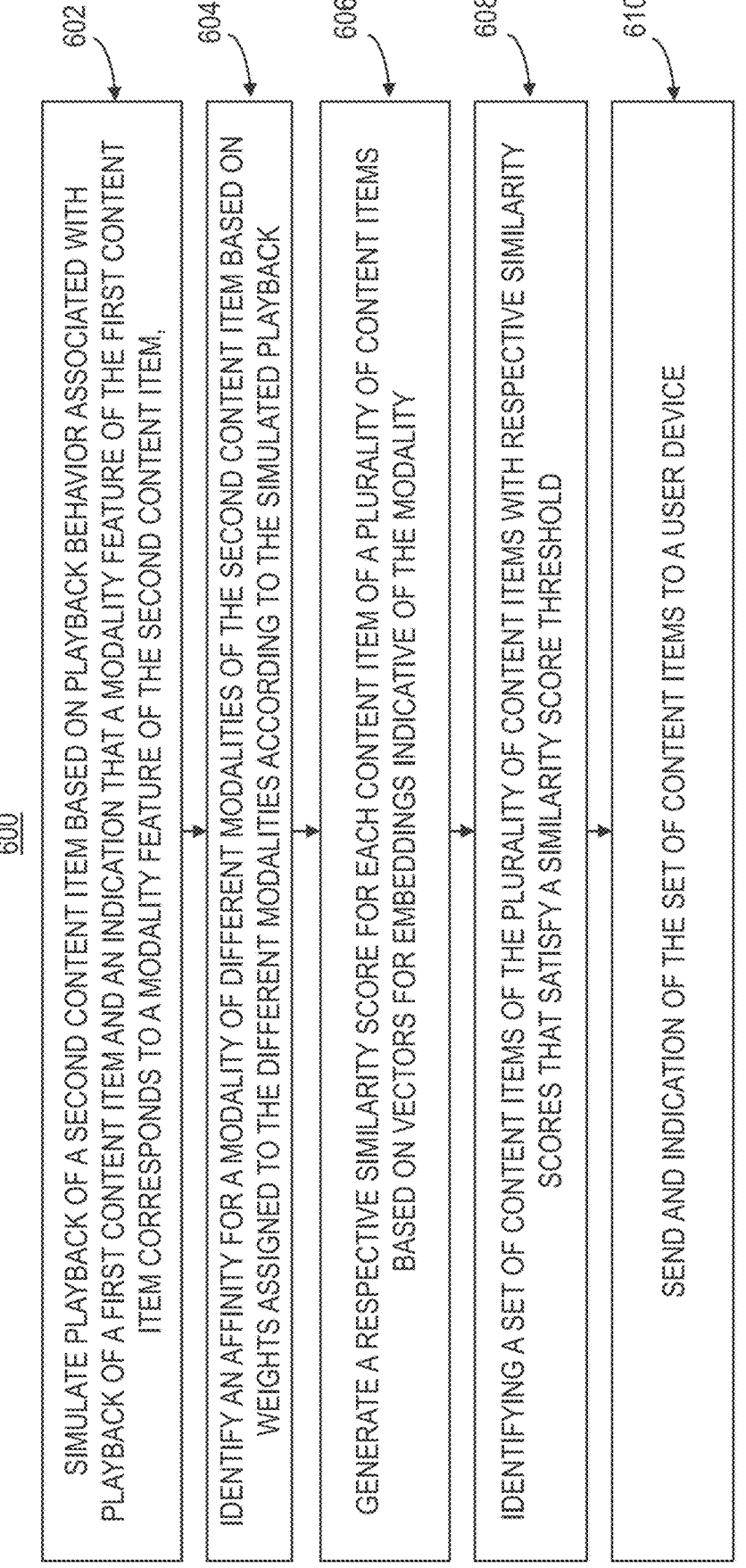

600

602   SIMULATE PLAYBACK OF A SECOND CONTENT ITEM BASED ON PLAYBACK BEHAVIOR ASSOCIATED WITH PLAYBACK OF A FIRST CONTENT ITEM AND AN INDICATION THAT A MODALITY FEATURE OF THE FIRST CONTENT ITEM CORRESPONDS TO A MODALITY FEATURE OF THE SECOND CONTENT ITEM,

604   IDENTIFY AN AFFINITY FOR A MODALITY OF DIFFERENT MODALITIES OF THE SECOND CONTENT ITEM BASED ON WEIGHTS ASSIGNED TO THE DIFFERENT MODALITIES ACCORDING TO THE SIMULATED PLAYBACK

606   GENERATE A RESPECTIVE SIMILARITY SCORE FOR EACH CONTENT ITEM OF A PLURALITY OF CONTENT ITEMS BASED ON VECTORS FOR EMBEDDINGS INDICATIVE OF THE MODALITY

608   IDENTIFYING A SET OF CONTENT ITEMS OF THE PLURALITY OF CONTENT ITEMS WITH RESPECTIVE SIMILARITY SCORES THAT SATISFY A SIMILARITY SCORE THRESHOLD

610   SEND AND INDICATION OF THE SET OF CONTENT ITEMS TO A USER DEVICE

FIG. 6

PERSONALIZED MULTIMODAL ANALYSIS FOR CONTENT ITEM RECOMMENDATION

BACKGROUND

Field

This disclosure is generally directed to personalized multimodal analysis for content item recommendation and, more particularly, to multimodal analysis of user-specific behavior to reduce presentation bias in content recommendation.

SUMMARY

Provided herein are system, apparatus, article of manufacture, method and/or computer program product embodiments, and/or combinations and sub-combinations thereof, for personalized multimodal analysis for content item recommendation. One or more computing devices may collect content interaction data (e.g., playback and contextual data, etc.) to generate a behavioral model, simulate user interactions according to the behavioral model to determine modality affinities, extract and weigh features from various content modalities, and use the weighted features to generate a detailed user persona. The user persona may be used to generate personalized content recommendations.

BRIEF DESCRIPTION OF THE FIGURES

The accompanying drawings are incorporated herein and form a part of the specification.

FIG. 6 illustrates a flowchart of an example method for personalized multimodal analysis for content item recommendation, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
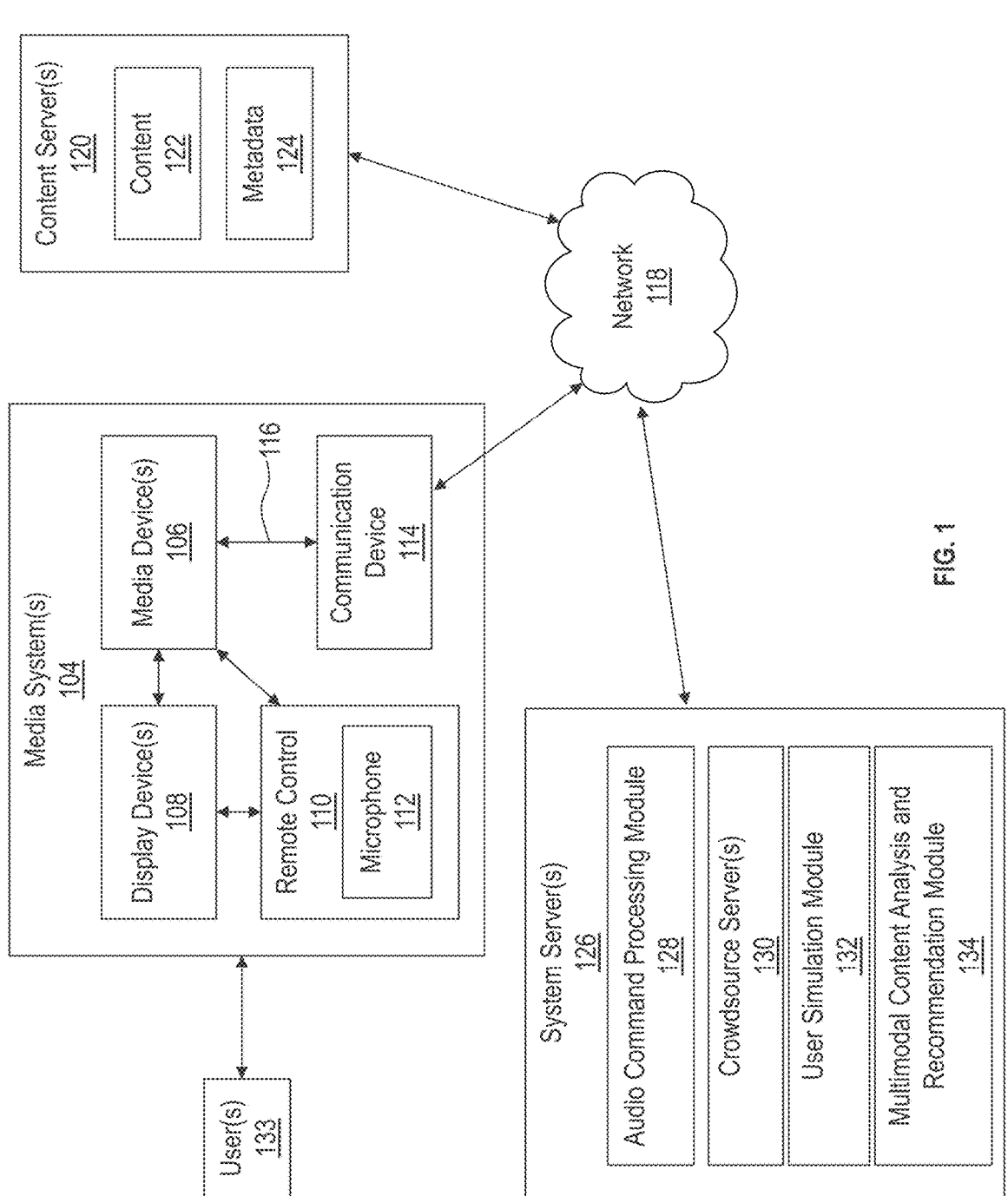
FIG. 1 illustrates a block diagram of a multimedia environment, according to some aspects of this disclosure.

Provided herein are system, apparatus, device, method and/or computer program product embodiments, and/or combinations and sub-combinations thereof, for personalized multimodal analysis for content item recommendation. With the proliferation of digital content, users often face difficulty in discovering content that matches their preferences. Traditional content delivery, retrieval, and recommendations systems routinely rely on explicit user feedback (e.g., ratings and reviews) or basic interaction (e.g., query, playback, etc.) tracking to provide users with a wide array of content choices and recommendations. For example, a user device searching for or requesting content may be presented with content items deemed to be most relevant to a user or most relevant to the request (e.g., based on various query parameters, etc.). However, traditional content delivery, retrieval, and recommendations systems often fail to capture the full spectrum of user preferences, especially across different content modalities such as text, audio, visual, and metadata. Existing systems cannot effectively integrate and weigh features from these diverse modalities according to a user's implicit preferences, leading to suboptimal recommendations.

Further, which content items are deemed the most relevant to a user or query may be subject to recommendation bias, popularity bias, active user bias, and the like. A positive feedback loop may cause bias where content items predicted to be relevant are presented to more users/user devices for playback and/or responsive to queries and, therefore, are repeatedly predicted as the most relevant for subsequent recommendations and/or queries. As described herein, personalized multimodal analysis for content item recommendation may be used to avoid such content recommendation and/or presentation bias.

According to some aspects of this disclosure, to optimize content recommendations and/or identify content items most relevant to a particular user, a content retrieval system, which may be implemented on one or more computing devices, can track/collect content item interaction behavior (e.g., playback, trick play, dwell time, selections, etc.) related to a user and/or user device to generate a content interaction bot. The content interaction bot may mimic the content interaction behavior of the user and/or user device. The content interaction bot may mimic the way the user and/or user device would interact with a plurality of content items and generate detailed descriptions across multiple modalities, including text, audio, and video. The multimodal descriptions may be used to build a comprehensive user persona for the user and/or user device. The user persona may be used to recommend/suggest new content items. For example, multimodal features may be extracted from the user persona and a summation of the extracted features may be used to predict additional content items for recommendation. Content recommendations/suggestions may include explanation data that indicates and/or highlights specific aspects of the multimodal descriptions that align with the preferences of the user and/or user device.

As described herein, the generation and use of a user model to recommend content items more relevant to a user is advantageous over conventional recommendation systems that simply track a user's playback behavior and recommend content based on features extracted from viewed/interacted content items. Notably, incorporating user models enables predictive models trained to recommend content based on feature similarity to capture a deeper and more nuanced understanding of user preferences and, therefore, generate more relevant and personalized content item recommendations that ultimately enhance user satisfaction and engagement. These and other technological advantages are described herein.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. As used in the specification and the appended claims, "content items" may also be referred to as "content," "content data," "content information," "content asset," "multimedia asset data file," or simply "data" or "information". Content items may be any information or data licensed to one or more individuals (or other entities, such as businesses or groups). Content may be electronic representations of video, audio, text, graphics, or the like which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether the format is presently known or developed in the future. The content items described herein may be electronic representations of music, spoken words, or other audio, which may be but is not limited to data files adhering to the MPEG1 Audio Layer 3 (.MP3) format, Adobe®, CableLabs 1.0, 1.1, 3.0, AVC, HEVC, H.264, Nielsen watermarks, V-chip data and Secondary Audio Programs (SAP), Sound Document (.ASND) format, or some other format configured to store electronic audio whether the format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether the format is presently known or developed in the future. Content items may be any combination of the above-described formats.

In a non-limiting example, multimedia environment 102 may be directed to streaming media. However, this disclosure is applicable to any media (instead of or in addition to streaming media), as well as any mechanism, means, protocol, method and/or process for distributing media.

According to some aspects of this disclosure, multimedia environment 102 may include one or more media systems 104. According to some aspects of this disclosure, media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. According to some aspects of this disclosure, user(s) 133 may operate with the media system 104 to query, select, and/or consume content items.

According to some aspects of this disclosure, each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

According to some aspects of this disclosure, the media device 106 may be a streaming media device, DVD or BLU-RAY device, audio/video playback device, cable box, and/or digital video recording device, to name just a few examples. Display device 108 may be a monitor, television (TV), computer, mobile device, smart device, tablet, wearable (such as a watch or glasses), appliance, internet of things (IoT) device, and/or projector, to name just a few examples. According to some aspects of this disclosure, media device 106 can be a part of, integrated with, operatively coupled to, and/or connected to its respective display device 108.

Figure 2:
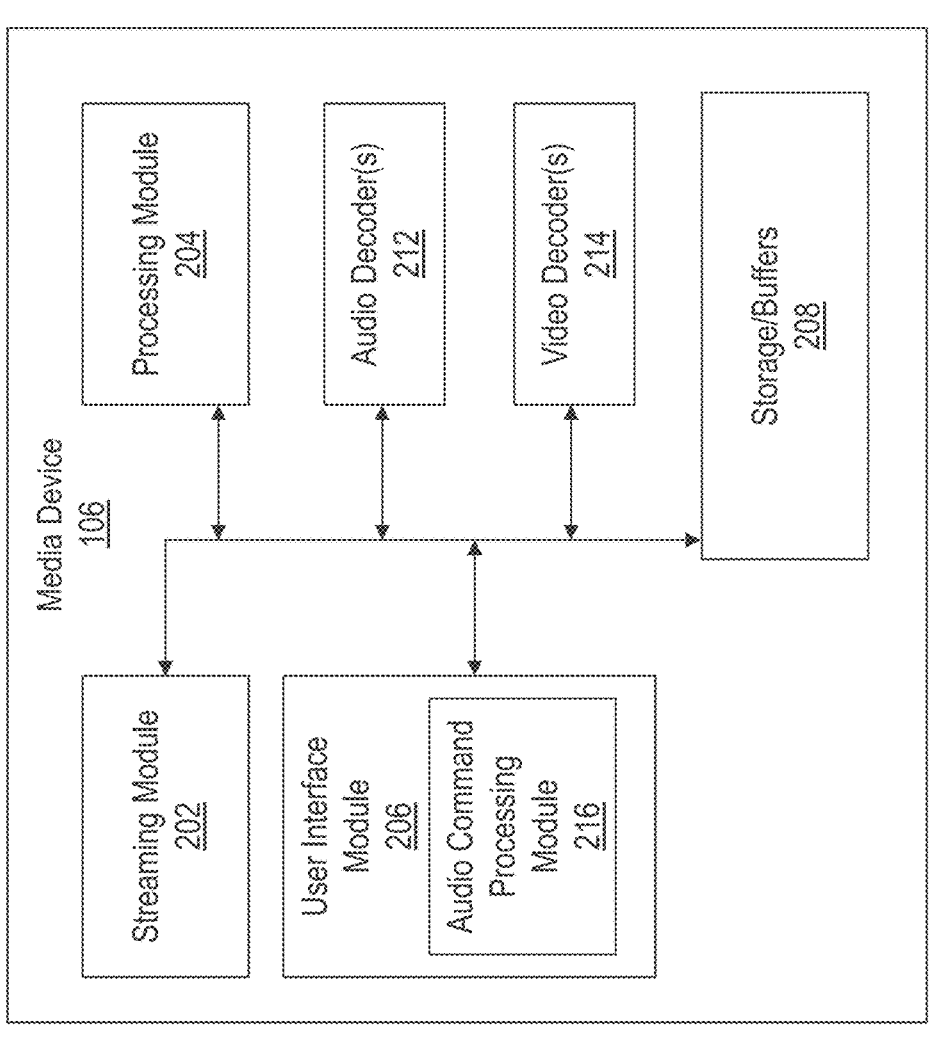
FIG. 2 illustrates a block diagram of a streaming media device, according to some aspects of this disclosure.

FIG. 2 illustrates a block diagram 200 of an example media device 106, according to some embodiments. Media device 106 may include a streaming module 202, processing module 204, storage/buffers 208, and user interface module 206. The user interface module 206 may include an audio command processing module 216.

According to some aspects of this disclosure, the media device 106 may include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Returning to FIG. 1, each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as Wi-Fi) and/or wired connections.

According to some aspects of this disclosure, network 118 can include, without limitation, wired and/or wireless intranet, extranet, Internet, cellular, Bluetooth, infrared, and/or any other short-range, long-range, local, regional, global communications mechanism, means, approach, protocol and/or network, as well as any combination(s) thereof.

According to some aspects of this disclosure, media system 104 may include a remote control 110. The remote control 110 can be any component, part, apparatus, and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

According to some aspects of this disclosure, multimedia environment 102 may include a plurality of content servers 120 (also called content providers, channels, or sources 120). Although only one content server 120 is shown in FIG. 1, in practice the multimedia environment 102 may include any number of content servers 120. Each content server 120 may be configured to communicate with network 118.

According to some aspects of this disclosure, each content server 120 may store content 122 and metadata 124. According to some aspects of this disclosure, content 122 may include advertisements, promotional content, commercials, and/or any advertisement-related content. According to some aspects of this disclosure, content 122 may include any combination of advertising supporting content including, but not limited to, content items (e.g. movies, episodic serials, documentaries, content, etc.), music, videos, movies, TV programs, multimedia, images, still pictures, text, graphics, gaming applications, ad campaigns, programming content, public service content, government content, local community content, software, and/or any other content and/or data objects in electronic form.

According to some aspects of this disclosure, metadata 124 comprises data about content 122. For example, metadata 124 may include associated or ancillary information indicating or related to writer, director, producer, composer, artist, actor, summary, chapters, production, history, year, trailers, alternate versions, related content, applications, objects depicted in content items, object types, closed captioning data/information, audio description data/information, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

According to some aspects of this disclosure, multimedia environment 102 may include one or more system server(s) 126. The system server(s) 126 may operate to support the media devices 106 from the cloud. It is noted that the structural and functional aspects of the system server(s) 126 may wholly or partially exist in the same or different ones of the system server(s) 126.

According to some aspects of this disclosure, system server(s) 126 may include an audio command processing module 128. As noted above, the remote control 110 may include a microphone 112. The microphone 112 may receive audio data from users 133 (as well as other sources, such as the display device 108). According to some aspects of this disclosure, the media device 106 may be audio responsive, and the audio data may represent verbal commands from the user 133 to control the media device 106 as well as other components in the media system 104, such as the display device 108.

According to some aspects of this disclosure, the audio data received by the microphone 112 in the remote control 110 is transferred to the media device 106, which is then forwarded to the audio command processing module 128 in the system server(s) 126. The audio command processing module 128 may operate to process and analyze the received audio data to recognize the user 133's verbal command. The audio command processing module 128 may then forward the verbal command back to the media device 106 for processing.

According to some aspects of this disclosure, the audio data may be alternatively or additionally processed and analyzed by an audio command processing module 216 in the media device 106 (see FIG. 2). The media device 106 and the system server(s) 126 may then cooperate to pick one of the verbal commands to process (either the verbal command recognized by the audio command processing module

128 in the system server(s) 126, or the verbal command recognized by the audio command processing module 216 in the media device 106).

Now referring to both FIGS. 1 and 2, in some embodiments, the user 133 may interact with the media device 106 via, for example, the remote control 110. For example, user 133 may use the remote control 110 to interact with the user interface module 206 of the media device 106 to query/search and/or select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 133.

According to some aspects of this disclosure, the media system 104 may include devices and/or components supporting and/or facilitating linear television, inter-device/component communications (e.g., HDMI inputs connected to gaming devices, etc.), online communications (e.g., Internet browsing, etc.) and/or the like.

According to some aspects of this disclosure, for example, in streaming embodiments, the streaming module 202 may transmit the content to the display device 108 in real-time or near real-time as it receives such content from the content server(s) 120. In non-streaming embodiments, the media device 106 may store the content received from content server(s) 120 in storage/buffers 208 for later playback on display device 108.

According to some aspects of this disclosure, the media devices 106 may exist in thousands or millions of media systems 104. Accordingly, the media devices 106 may lend themselves to crowdsourcing embodiments and, thus, the system server(s) 126 may include one or more crowdsource server(s) 130.

According to some aspects of this disclosure, using information received from the media devices 106 in the thousands and millions of media systems 104, the crowdsource server(s) 130 may identify similarities and overlaps between closed captioning requests issued by different users 133 watching a content item, advertisement, and/or the like. Based on such information, the crowdsource server(s) 130 may determine that turning closed captioning on may enhance users' viewing experience at particular portions of the content item, advertisement, and/or the like (for example, when the soundtrack of the content item, advertisement, and/or the like is difficult to hear), and turning closed captioning off may enhance users' viewing experience at other portions of the content item, advertisement, and/or the like (for example, when displaying closed captioning obstructs critical visual aspects of the content item, advertisement, and/or the like). Accordingly, the crowdsource server(s) 130 may operate to cause closed captioning to be automatically turned on and/or off during future streaming of the content item, advertisement, and/or the like.

According to some aspects of this disclosure, using information received from the media devices 106 (and/or user device(s) 103) in the thousands and millions of media systems 104, the crowdsource server(s) 130 may identify media devices (and/or user devices) to target with and/or acquire from bid stream data, communications, information, and/or the like. For example, the most popular content items may be determined based on the amount of content items are requested (e.g., viewed, accessed, etc.) by media devices 106.

According to some aspects of this disclosure, using information received from the media devices 106 in the thousands and millions of media systems 104, the crowdsource server(s) 128 may identify similarities and overlaps between closed captioning requests issued by different users 133 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

According to some aspects of this disclosure, system server(s) 126 may include a user simulation module 132 and a multimodal content analysis and recommendation module 134. According to some aspects of this disclosure, user simulation module 132 may collect, record, and/or track content interaction data associated with a media device 106 and/or specific to a user 133. According to some aspects of this disclosure, user simulation module 132 may receive content interaction data associated with a media device 106 and/or specific to a user 133 from crowdsource server(s) 130. User simulation module 132 may use the content interaction data to generate a user behavioral model that represents content interaction/consumption habits for a media device 106 and/or specific user 133.

User simulation module 132 may use content interaction data and/or a user behavioral model to simulate behavior associated with the media device 106 and/or specific user 133 across various content items using a content interaction bot. The content interaction bot may generate and/or simulate interactions with the selected content items to generate detailed summaries and/or logs of user-specific content interaction data. Multimodal content analysis and recommendation module 134 may perform multi-modality analysis of content items identified/interacted with by the content interaction bot. Modality-specific embeddings may be generated for each content item identified/interacted with by the content interaction bot. Modality-specific embeddings may be combined into a unified multimodal representation. Multimodal content analysis and recommendation module 134 may aggregate the unified multimodal representations of all content items interacted with by the content interaction bot to generate a detailed user persona that reflects a user's preferences, affinities, and/or taste across text, audio, and visual modalities.

According to some aspects of this disclosure, multimodal content analysis and recommendation module 134 may apply processing techniques, such as artificial intelligence, semantic analysis, lexical analysis, exact-match retrieval, statistical models, logical processing algorithms, and/or the like on a user persona to identify content items most relevant to the user's preferences, affinities, and/or taste across different modalities (e.g., text, audio, and visual modalities, etc.) and recommend the identified content items for playback and/or consumption.

Personalized Multimodal Analysis for Content Item Recommendation

According to some aspects of this disclosure, to facilitate personalized multimodal analysis for content item recommendation, user simulation module 132 may collect, record, and/or track content interaction data associated with a media device 106 and/or specific to a user 133. According to some aspects of this disclosure, user simulation module 132 may receive content interaction data associated with a media device 106 and/or specific to a user 133 from crowdsource server(s) 130. Content interaction data may include, but is not limited to, content preferences (e.g., frequently watched genres, content types, etc.), playback actions (e.g., play, pause, skip, trick play, etc.), engagement metrics (e.g., duration watched, time to first skip, etc.), user reactions (e.g., content item likes, dislikes, shares, comments, etc.), contextual data (e.g., time of day, location, device type, search queries, network conditions, etc.), behavioral aspects (e.g., most frequently watched content items, how often a user finishes a content item versus abandoning it, etc.), and/or the like.

User simulation module 132 may analyze content interaction data to identify patterns, preferences, and/or the like. For example, user simulation module 132 may use time series analysis to identify how interactions with content items occur over time. User simulation module 132 may use behavioral analysis to identify common user behaviors such as frequently watched content items, popular content, trick play actions, and/or the like. User simulation module 132 may use path analysis to identity patterns in the order of content item interactions (e.g., does a user watch trailers before content item playback, does a user skip content item introductions or end credits, etc.). User simulation module 132 may analyze content interaction data to identify patterns and preferences in the content interaction data via statistical analysis and/or one or more machine learning algorithms. User simulation module 132 may use any technique to identify patterns, preferences, and/or the like in content interaction data. User simulation module 132 may use the patterns, preferences, and/or the like may be used to generate a behavioral model that represents content interaction behavior and/or content consumption habits for a user 133 and/or media device 106.

User simulation module 132 may use a user behavioral model to simulate and/or mimic behavior associated with the media device 106 and/or specific user 133 across various content items using a content interaction bot. User simulation module 132 may include one or more aspect learning models that analyze user features and historical interactions in a behavioral model to create a user persona where the content interaction bot acts as a proxy for the media device 106 and/or specific user 133, mimicking actions based on the user behavioral model. The content interaction bot may identify and/or select content items for playback/interaction based on user preferences indicated by a user behavioral model. The content interaction bot may generate and/or simulate interactions with the selected content items to generate detailed summaries and/or logs of user-specific content interaction data.

User simulation module 132 may collect and store detailed content and/or content interaction data associated with the content interaction bot including, but not limited to, playback actions (e.g., play, pause, skip, trick play, etc.), engagement metrics (e.g., duration watched, time to first skip, etc.), user reactions (e.g., content item likes, dislikes, etc.), contextual data (e.g., time of day, location, device type, etc.). Detailed content and/or content interaction data associated with the content interaction bot may be used to generate a user persona.

User personas (e.g., generated from simulated/mimicked content interaction data, etc.) may capture comprehensive interaction data. According to some aspects of this disclosure, system server(s) 126 may include multimodal content analysis and recommendation module 134.

Multimodal content analysis and recommendation module 134 may perform multi-modality analysis of content items identified/interacted with by the content interaction bot. Multimodal content analysis and recommendation module 134 may include one or more embedding models, language representation models, recurrent neural networks (RNNs), convolutional neural networks (CNNs), and/or the like that may be used to generate modality-specific embeddings for each content item identified/interacted with by the content interaction bot.

For example, multimodal content analysis and recommendation module 134 may include a multimodal feature extractor that is conditioned on a predicted user persona from a user persona and multimodal content item features. Multimodal content analysis and recommendation module 134 may extract textual features from content interaction data using Natural Language Processing (NLP) techniques and/or the like which include, but are not limited to, keyword extraction, sentiment analysis, topic modeling, and/or the like, then use the extracted features to generate textual embedding. Multimodal content analysis and recommendation module 134 may extract audio features from content interaction data by analyzing speech patterns, music genres, emotional tones, and/or the like using audio processing techniques including, but not limited to, Mel-frequency cepstral coefficients (MFCCs), spectral features, etc., then use a specially trained RNN, CNN, and/or the like to generate audio embeddings. Multimodal content analysis and recommendation module 134 may extract visual features from content interaction data by detecting objects, scenes, color schemes, facial expressions, and/or the like using computer vision techniques and/or the like, then use a specially trained RNN, CNN, and/or the like to generate visual embeddings. Multimodal content analysis and recommendation module 134 may use any technique to generate multimodal embeddings from content interaction data generated by a content interaction bot.

According to some aspects of this disclosure, when generating a user persona, multimodal content analysis and recommendation module 134 may normalize content interaction data embeddings from different modalities to ensure they are on a similar scale. Multimodal content analysis and recommendation module 134 may use techniques including, but not limited to, min-max scaling, z-score normalization, and/or the like to normalize content interaction data embeddings from different modalities. For time-series based interaction data, multimodal content analysis and recommendation module 134 may align embeddings temporally. For example, multimodal content analysis and recommendation module 134 may synchronize audio and video embeddings based on timestamps indicated by the content interaction data. According to some aspects of this disclosure, multimodal content analysis and recommendation module 134 may also employ dimensionality reduction, fusion (e.g., early fusion, late fusion, hybrid fusion, attention/weighting mechanisms, etc.), and/or any other techniques to normalize content interaction data embeddings from different modalities.

Normalized modality-specific embeddings may be combined into a unified multimodal representation. Multimodal content analysis and recommendation module 134 may aggregate unified multimodal representations of all content items interacted with by the content interaction bot to generate a detailed user persona that reflects a user's preferences, affinities, and/or taste across various modalities including, but not limited to, text, audio, and visual modalities.

Multimodal content analysis and recommendation module 134 may use a user persona to generate multimodal descriptions of content interaction data included within a user persona. For example, a description of content interactions gleaned from a user persona may include a description of a watched content item that describes the content item as close to how a user 133 would describe the content item post playback. The description of content interaction may be separated into different modality embedding spaces including, but not limited to, text summarization in a text embedding space, video summarization in a video embedding space, audio summarization in an audio embedding space, and/or the like. Multimodal content analysis and recommendation module 134 may summarize data from a user persona in all available modalities.

According to some aspects of this disclosure, when generating a user persona, multimodal content analysis and recommendation module 134 may assign features from different modalities different weights based on modality affinity indicated by content interaction data used to generate the user persona. Multimodal content analysis and recommendation module 134 may analyze content interaction data to determine a user's affinity for each modality. For example, suppose the user frequently replays scenes with specific music. In that case, their audio affinity might be high, or multimodal content analysis and recommendation module 134 may assign a higher weight to visual features if the user shows a high affinity to video or imagery. Multimodal content analysis and recommendation module 134 may assign weights to different modalities based on the calculated affinities. Multimodal content analysis and recommendation module 134 may combine features from all modalities, applying the calculated weights to each feature set to generate a comprehensive feature vector that reflects the user's preferences across all modalities. A higher affinity for a modality results in a higher weight for that modality's features in the recommendation process.

Multimodal content analysis and recommendation module 134 may use the summarization of content interactions and identified modality affinities to recommend additional content items most relevant to a user 133. Multimodal content analysis and recommendation module 134 may use multimodal feature vectors to identify and recommend content items. According to some aspects of this disclosure, multimodal content analysis and recommendation module 134 may cause independently trained predictive models (e.g., machine learning models, neural networks, etc.) included, configured with, and/or in communication with (and/or the like) the multimodal content analysis and recommendation module 134 to concurrently run vector searches to identify content items in a content retrieval system based on different data modality descriptions of content interaction included in a user persona.

For example, a first vector search on a first data modality and a second vector search on second data modality may be performed using modal data from a user persona as a search parameter. For example, according to some aspects, a first vector search may be performed by a first predictive model on image data from watched/playback content items indicated by a user persona. The first vector search may be performed if a user persona indicates an affinity for visual data. A specially trained predictive model of multimodal content analysis and recommendation module 134 may use an image recognition technique to extract relevant features from the images associated with different content items in a repository (and/or database) and match them with the features from the from watched/playback content items indicated by a user persona.

According to some aspects of this disclosure, a second vector search performed by a second predictive model on text description data may use natural language processing (NLP) and/or the like to process text descriptions associated with different content items in the repository (and/or database) and generate similarity scores based on a degree of match with text (e.g., textual embeddings, etc.) from watched/playback content items indicated by a user persona. According to some aspects of this disclosure, any amount of vector searches may be performed by predictive models of multimodal content analysis and recommendation module 134 on modal data associated with different content items in the repository (and/or database) and generate similarity scores based on a degree of match with the data of the same modality from watched/playback content items indicated by a user persona.

According to some aspects of this disclosure, multimodal content analysis and recommendation module 134 may normalize similarity scores generated by the first and second predictive models that indicate similarity between content items indicated by a user persona and content items identified from the searches performed by the predictive models. According to some aspects of this disclosure, multimodal content analysis and recommendation module 134 may normalize similarity scores generated by the first and second predictive models to ensure that the scores are comparable and can be combined. For example, multimodal content analysis and recommendation module 134 may normalize similarity scores generated by different predictive models (e.g., the first and second predictive models, etc.) by converting respective similarity scores into standardized scores, such as Z-scores and/or the like, or by transforming them into a common scale.

For example, according to some aspects of this disclosure, multimodal content analysis and recommendation module 134 may calculate the mean and standard deviation of the list of similarity scores generated by the first predictive model, and calculate the mean and standard deviation of the list of similarity scores generated by the second predictive model. According to some aspects of this disclosure, multimodal content analysis and recommendation module 134 may assume that both lists of similarity scores follow a normal distribution. According to some aspects of this disclosure, multimodal content analysis and recommendation module 134 may normalize the similarity scores generated by the first and second predictive models by replacing them with the value of their respective cumulative distribution functions. Despite originating from different embedding spaces, when normalized the similarity scores generated by the first and second predictive models have a probabilistic interpretation. For example, a similarity score of 0.9 generated by either the first or the second predictive models may mean that it lies in the 90 percentile of the respective distribution. According to some aspects of this disclosure, multimodal content analysis and recommendation module 134 may combine normalized scores, for example, by adding them and/or the like.

According to some aspects of this disclosure, if a similarity score for a content item exists in a list of similarity scores generated by one predictive model and not the other, multimodal content analysis and recommendation module 134 may consider the score of the list it appears in as its final score. According to some aspects of this disclosure, if a similarity score for a content item exists in multiple lists of similarity scores, multimodal content analysis and recommendation module 134 may calculate an average of the scores average of these two scores as a final score for a content item.

Candidate content items may be ranked based on similarity scores. According to some aspects of this disclosure, multimodal content analysis and recommendation module 134 may recommend content items with similarity scores that satisfy and/or exceed a threshold. For example, multimodal content analysis and recommendation module 134 may recommend the top-N content items with the highest scores. Multimodal content analysis and recommendation module 134 may cause an indication of recommended content items to be sent to a media device 106. By integrating multimodal analysis and assigning weights based on affinities indicated by a user persona, multimodal content analysis and recommendation module 134 may better understand and cater to diverse content preferences, leading to more relevant recommendations than traditional content recommendation systems.

According to some aspects of this disclosure, multimodal content analysis and recommendation module 134 may include an explainable recommender machine learning model that may use a summary of all past interactions in multimodality space and multimodal content item features in multimodality space to rank content items and predict/recommend content items to a user based on a user persona and/or behavioral data. For example, multimodal content analysis and recommendation module 134 may generate explanation data for content item recommendations. Explanation data may include textual data output by the explainable recommender machine learning model may highlight specific aspects of a user persona and content item features that led to any recommendation. Multimodal content analysis and recommendation module 134 may compare different modalities analyzed for a content item recommendation and explain which features (e.g., text keywords, audio patterns, visual elements, etc.) were most similar between a user persona and the recommended items. For example, a content item recommendation explanation generated based on textual modality data may indicate "this movie is recommended because its plot keywords match those of the movies you have liked before." A content item recommendation explanation generated based on audio modality data may indicate "the soundtrack of this song is similar to the genres you frequently listen to." A content item recommendation explanation generated based on visual modality data may indicate "the visual style of this movie matches the scenes you often watch."

Figure 3:
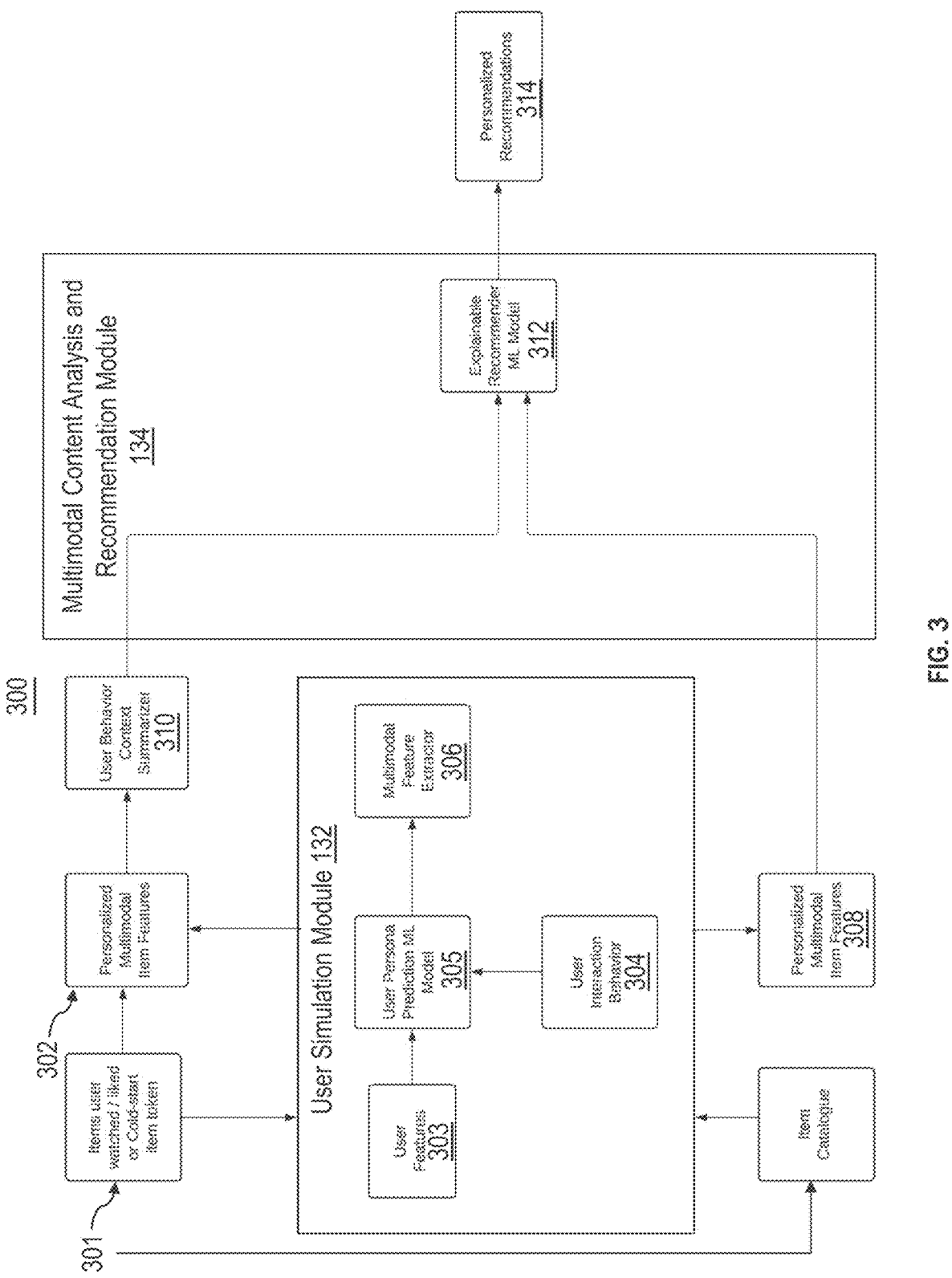
FIG. 3 illustrates a block diagram of modules for personalized multimodal analysis for content item recommendation, according to some aspects of this disclosure.

FIG. 3 shows an example block diagram 300 of user simulation module 132 and multimodal content analysis and recommendation module 134. According to some aspects of this disclosure, content item data 301, which may include, but is not limited to, content intent interaction data associated with multiple different users (e.g., content interaction data received from crowd source server(s) 130, etc.), content items with cold-start tokens, content items of a catalogue/content retrieval system, etc., may be analyzed and multimodal item features 302 may be extracted. According to some aspects of this disclosure, multimodal item features 302 may be generated by one or more multimodal feature extractors of user simulation module 132. Multimodal item features, which may include content metadata and/or the like, may be user agnostic such that they do not change based on a user. According to some aspects of this disclosure, multimodal item features 302 may be transformed and/or personalized for content item recommendations.

User simulation module 132 may include a user features module 303 that identifies user-specific features from content interaction data 301 and provides the user-specific features to a user persona prediction machine learning (ML) model 305. User simulation module 132 may include a user interaction behavior module 304 that identifies user behavioral features from content interaction data 301 and provides the behavioral features to user persona prediction machine learning (ML) model 304. User persona prediction machine learning (ML) model 304 may use the user-specific features and the behavioral data to generate a behavioral model that represents content interaction/consumption habits for specific users 133.

A behavioral model may be used to generate a content interaction bot. The content interaction bot may mimic the content interaction behavior of the user and/or user device. The content interaction bot may mimic the way the user and/or user device interact with a plurality of content items. Data output by the content interaction bot may be used to generate detailed descriptions across multiple modalities, including text, audio, and video. The multimodal descriptions may be used to build a comprehensive user persona for the user and/or user device. The user persona may be used to recommend/suggest new content items.

For example, multimodal content analysis and recommendation module 134 may include a user behavior content summarizer model 310 that generates a summary of all of the historical interactions of a user with content items in multimodality space. Multimodal content analysis and recommendation module 134 may include an explainable recommender machine learning (ML) model 312 that analyzes user-agnostic multimodal item features 302, personalized multimodal features 308, and summaries of all of the historical interactions of a user with content items in multimodality space output by user behavior content summarizer model. Explainable recommender machine learning (ML) model 312 may assimilate user-agnostic multimodal item features 302, personalized multimodal features 308, and summaries of all of the historical interactions of a user to identify a content item taste and/or content item preferences for a user and predict the most relevant content items for the user. For example, explainable recommender machine learning (ML) model 312 may output personalized recommendations 314.

Figure 4:
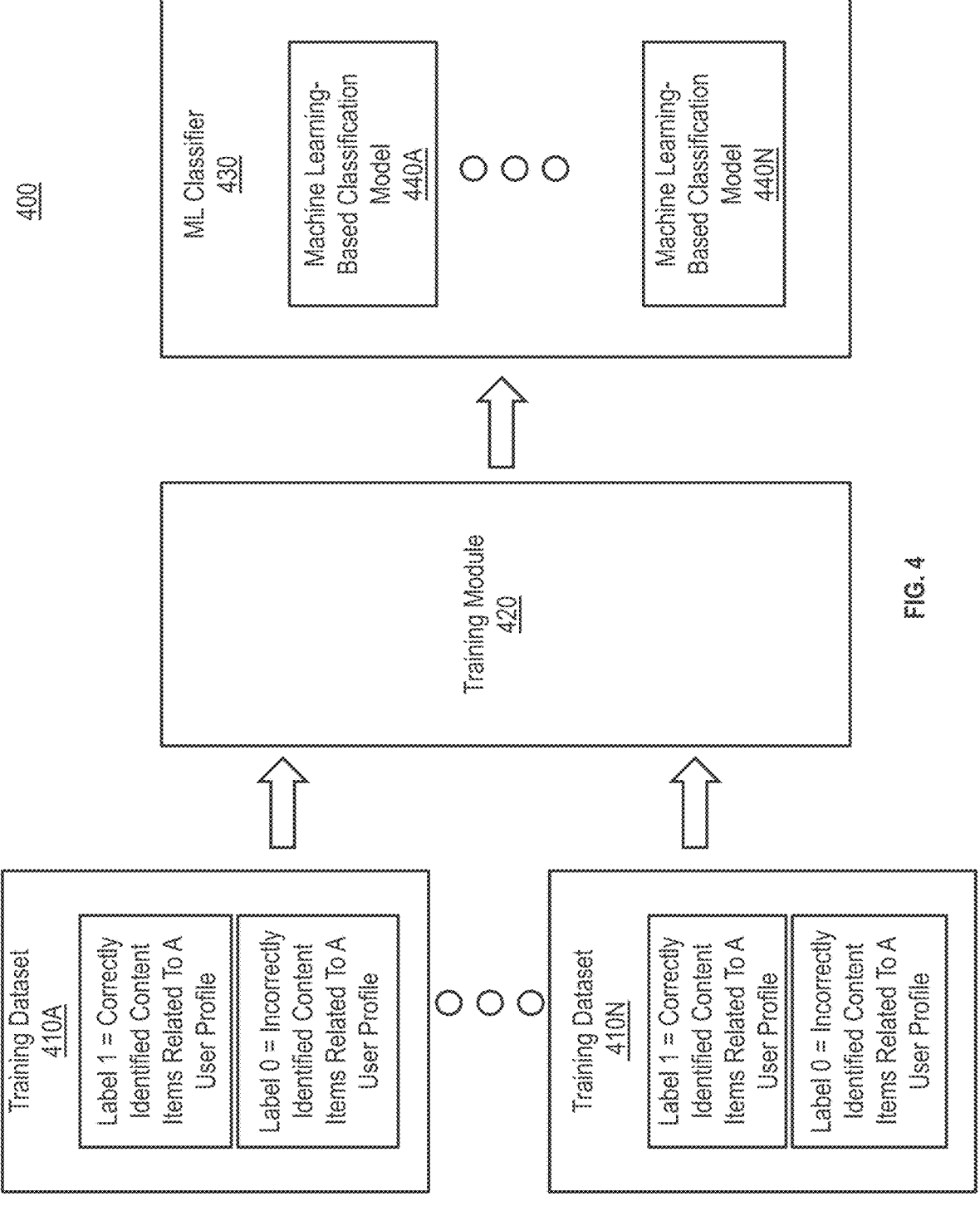
FIG. 4 illustrates an example system for training a module for personalized multimodal analysis for content item recommendation, according to some embodiments.

FIG. 4 is an example system 400 for training predictive models of the multimodal content analysis and recommendation module 134 to determine correspondences and/or similarities between modal information associated with content items indicated by a user persona and modal information associated with content items. FIG. 4 is described with reference to FIG. 1.

According to some aspects of this disclosure, the system 4400 may use machine learning techniques to train one or more machine learning-based classifiers 430 (e.g., a software model, neural network classification layer, etc.). The machine learning-based classifier 430 may be trained by the multimodal content analysis and recommendation module 134 based on an analysis of one or more training datasets 410A-410N. The machine learning-based classifier 430 may be configured to classify features for a specific modality and/or data type (e.g., textual data, image data, audio data, ancillary content item data, etc.) extracted from user personas, as well as content items stored and/or available within a repository, catalog, database, via a service, and/or the like.

According to some aspects of this disclosure, one or more training datasets 410A-410N may comprise labeled baseline data such as labels that indicate textual features (e.g., semantic text similarity, lexical similarities, etc.), video/image features (e.g., attributes and/or contextual items of image/depictions that indicate similarities in video/image data, etc.), audio features (e.g., sonic attributes, tones, pitches, vocal patterns, rhythms/beats, etc. that indicate similarities in audio content, etc.), ancillary features, correlations between data types (e.g., text-to-image similarity, etc.), and/or the like. The labeled baseline data may include any number of feature sets. Feature sets may include, but are not limited to, labeled data that identifies extracted features from user personas, as well as content items available within a repository, catalog, database, via a service, and/or the like.

According to some aspects of this disclosure, the labeled baseline data may be stored in one or more databases. Data for personalized multimodal analysis for content item recommendation and/or the like may be randomly assigned to a training dataset or a testing dataset. According to some aspects of this disclosure, the assignment of data to a training dataset or a testing dataset may not be completely random. In this case, one or more criteria may be used during the assignment, such as ensuring that similar text, similar textual connotations, similar textual semantics, similar lexical items, similar visual element/attributes, similar visual semantics, similar sonic attributes, similar tones/pitches, similar vocal patterns, similar rhythms/beats, similar ancillary items, dissimilar text, dissimilar textual connotations, dissimilar textual semantics, dissimilar lexical items, dissimilar visual element/attributes, dissimilar visual semantics, dissimilar sonic attributes, dissimilar tones/pitches, dissimilar vocal patterns, dissimilar rhythms/beats, dissimilar ancillary items, and/or the like may be used in each of the training and testing datasets. In general, any suitable method may be used to assign the data to the training or testing datasets.

According to some aspects of this disclosure, the multimodal content analysis and recommendation module 134 may train the machine learning-based classifier 430 by extracting a feature set from the labeled baseline data according to one or more feature selection techniques. According to some aspects of this disclosure, the multimodal content analysis and recommendation module 134 may further define the feature set obtained from the labeled baseline data by applying one or more feature selection techniques to the labeled baseline data in the one or more training datasets 410A-410N. The multimodal content analysis and recommendation module 134 may extract a feature set from the training datasets 410A-410N in a variety of ways. The multimodal content analysis and recommendation module 134 may perform feature extraction multiple times, each time using a different feature-extraction technique. In some instances, the feature sets generated using the different techniques may each be used to generate different machine learning-based classification models 4440. According to some aspects of this disclosure, the feature set with the highest quality metrics may be selected for use in training. The multimodal content analysis and recommendation module 134 may use the feature set(s) to build one or more machine learning-based classification models 440440440A-440N that are configured to determine and/or predict associations between content items indicated by a user persona and a plurality of content items, such as content items within a repository, system, content source, and/or the like.

According to some aspects of this disclosure, the training datasets 410A-410N and/or the labeled baseline data may be analyzed to determine any dependencies, associations, and/or or correlations between content items indicated by a user persona and a plurality of content items, such as content items within a repository, system, content source, and/or the like in the training datasets 410A-410N and/or the labeled baseline data. The term "feature," as used herein, may refer to any characteristic of an item of data that may be used to determine whether the item of data falls within one or more specific categories. Features may indicate and/or represent any elements, values, properties, qualities, and/or the like of any data modality.

According to some aspects of this disclosure, a feature selection technique may comprise one or more feature selection rules. The one or more feature selection rules may comprise determining which features in the labeled baseline data appear over a threshold number of times in the labeled baseline data and identifying those features that satisfy the threshold as candidate features. For example, any features that appear greater than or equal to 2 times in the labeled baseline data may be considered candidate features. Any features appearing less than 2 times may be excluded from consideration as a feature. According to some aspects of this disclosure, a single feature selection rule may be applied to select features or multiple feature selection rules may be applied to select features. According to some aspects of this disclosure, the feature selection rules may be applied in a cascading fashion, with the feature selection rules being applied in a specific order and applied to the results of the previous rule. For example, the feature selection rule may be applied to the labeled baseline data to generate information (e.g., indications of similarities between content items indicated by a user persona and a plurality of content items available within a content retrieval system, etc.) that may be used for personalized multimodal analysis for content item recommendation. A final list of candidate features may be analyzed according to additional features.

According to some aspects of this disclosure, the multimodal content analysis and recommendation module 134 may generate information (e.g., indications of similarities between content items indicated by a user persona and a plurality of content items available within a content retrieval system, etc.) that may be used for personalized multimodal analysis for content item recommendation based on a wrapper method. A wrapper method may be configured to use a subset of features and train the machine learning model using the subset of features. Based on the inferences that are drawn from a previous model, features may be added and/or deleted from the subset. Wrapper methods include, for example, forward feature selection, backward feature elimination, recursive feature elimination, combinations thereof, and the like. According to some aspects of this disclosure, forward feature selection may be used to identify one or more candidate content items that relate to one or more content items indicated by a user persona. Forward feature selection is an iterative method that begins with no feature in the machine learning model. In each iteration, the feature which best improves the model is added until the addition of a new variable does not improve the performance of the machine learning model. According to some aspects of this disclosure, backward elimination may be used to identify one or more candidate content items that relate to one or more content items indicated by a user persona. Backward elimination is an iterative method that begins with all features in the machine learning model. In each iteration, the least significant feature is removed until no improvement is observed in the removal of features. According to some aspects of this disclosure, recursive feature elimination may be used to identify one or more candidate content items that relate to one or more content items indicated by a user persona. Recursive feature elimination is a greedy optimization algorithm that aims to find the best-performing feature subset. Recursive feature elimination repeatedly creates models and keeps aside the best or the worst-performing feature at each iteration. Recursive feature elimination constructs the next model with the features remaining until all the features are exhausted. Recursive feature elimination then ranks the features based on the order of their elimination.

According to some aspects of this disclosure, one or more candidate content items that relate to one or more content items indicated by a user persona may be determined according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to an absolute value of the magnitude of coefficients and ridge regression performs L2 regularization which adds a penalty equivalent to the square of the magnitude of coefficients. According to some aspects of this disclosure, embedded methods may include textual data, image data, audio data, ancillary content item data, and/or the like being mapped to an embedding space to enable similarity between content items within a repository (or available via a content retrieval system, etc.) and content items indicated by a user persona. According to some aspects of this disclosure, after multimodal content analysis and recommendation module 134 generates a feature set(s), the multimodal content analysis and recommendation module 134 may generate a machine learning-based predictive model 440 based on the feature set(s). A machine learning-based predictive model may refer to a complex mathematical model for data classification that is generated using machine-learning techniques. For example, this machine learning-based classifier may include a map of support vectors that represent boundary features. By way of example, boundary features may be selected from and/or represent the highest-ranked features in a feature set.

According to some aspects of this disclosure, the multimodal content analysis and recommendation module 134 may use the feature sets extracted from the training datasets 410A-410N and/or the labeled baseline data to build a machine learning-based classification model 440440440A-440N to determine and/or predict content items that relate to one or more content items indicated by a user persona and/or the like. According to some aspects of this disclosure, the machine learning-based classification models 440440440A-440N may be combined into a single machine learning-based classification model 440. Similarly, the machine learning-based classifier 430 may represent a single classifier containing a single or a plurality of machine learning-based classification models 440 and/or multiple classifiers containing a single or a plurality of machine learning-based classification models 440. For example, according to some aspects of this disclosure, machine learning-based classification models 440440440A-440N may each classify a different modality of data. According to some aspects of this disclosure, the machine learning-based classifier 430 may also include each of the training datasets 410A-410N and/or each feature set extracted from the training datasets 410A-410N and/or extracted from the labeled baseline data. Although shown separately, multimodal content analysis and recommendation module 134 may include the machine learning-based classifier 430.

According to some aspects of this disclosure, the extracted features from requests and/or queries for content items, as well as content items available within a repository, catalog, database, via a service, and/or the like may be combined and/or implemented on classification models trained using a machine learning approach such as a siamese neural network (SNN); discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); other neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning-based classifier 430 may comprise a decision rule or a mapping that uses textual data, image data, audio data, ancillary content item data, and/or the like to determine and/or predict content items that relate to one or more content items indicated by a user persona.

According to some aspects of this disclosure, the textual data, image data, audio data, ancillary content item data, and/or the like, and the machine learning-based classifier 430 may be used to determine and/or predict content items that relate to one or more content items indicated by a user persona for the test samples in the test dataset. For example, the result for each test sample may include a confidence level that corresponds to a likelihood or a probability that the corresponding test sample accurately determines and/or predicts content items that relate to one or more content items indicated by a user persona. The confidence level may be a value between zero and one that represents a likelihood that the determined/predicted content items that relate to one or more content items indicated by a user persona are consistent with computed values. Multiple confidence levels may be provided for each test sample and each candidate (approximated) content item that relates to one or more content items indicated by a user persona. A top-performing candidate content item that relates to one or more content items indicated by a user persona may be determined by comparing the result obtained for each test sample with a computed content item that relates to one or more content items indicated by a user persona for each test sample. In general, the top-performing candidate content item that relates to one or more content items indicated by a user persona will have results that closely match the computed content item that relates to one or more content items indicated by a user persona. The top-performing candidate content items that best match one or more content items indicated by a user persona may be used for personalized multimodal analysis for content item recommendation operations.

Figure 5:
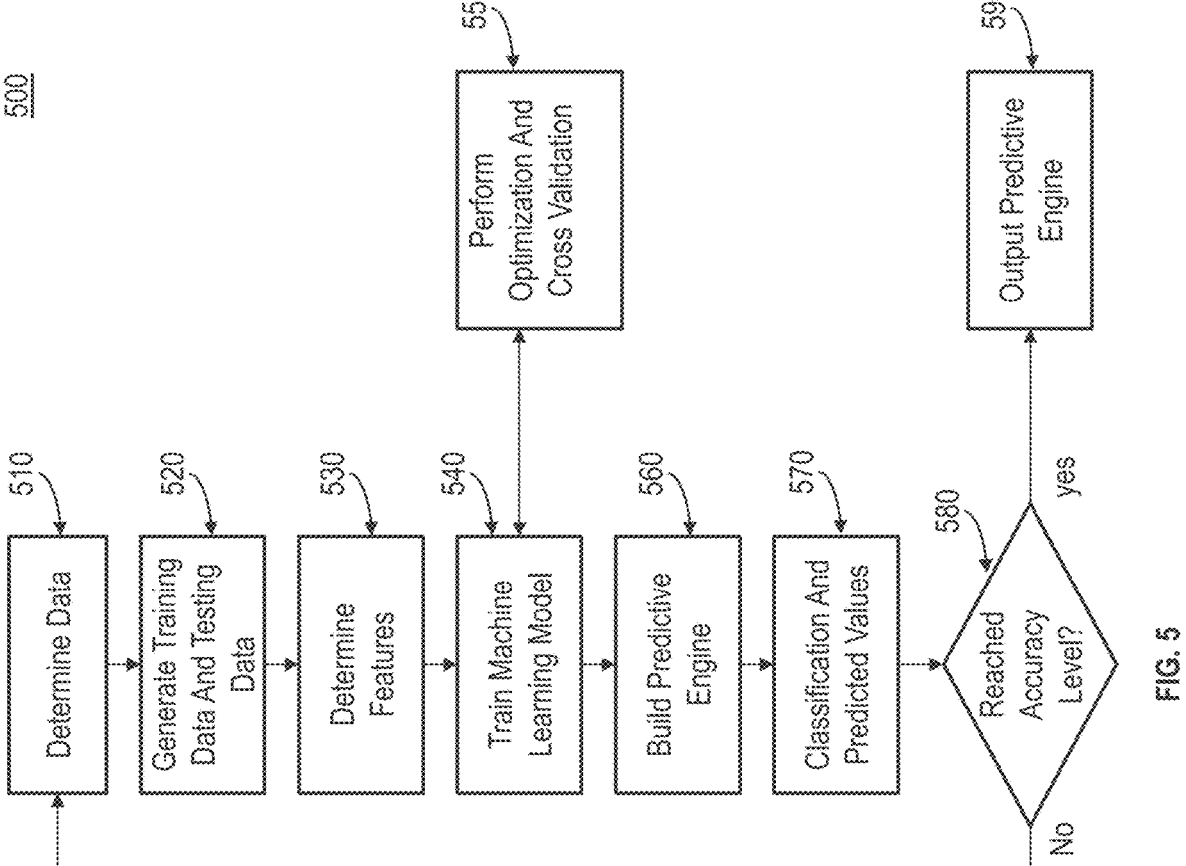
FIG. 5 illustrates a flowchart of an example training method for generating a machine learning classifier to classify data used for personalized multimodal analysis for content item recommendation, according to some embodiments.

FIG. 5 is a flowchart illustrating an example training method 500. According to some aspects of this disclosure, method 500 configures machine learning classifier 430 for classification through a training process using the multimodal content analysis and recommendation module 134. The multimodal content analysis and recommendation module 134 can implement supervised, unsupervised, and/or semi-supervised (e.g., reinforcement-based) machine learning-based classification models 440. The method 500 shown in FIG. 5 is an example of a supervised learning method; variations of this example of training method are discussed below, however, other training methods can be analogously implemented to train unsupervised and/or semi-supervised machine learning (predictive) models. For example, multimodal content analysis and recommendation module 134 can train one or more predictive models to learn meaningful representations of the data (e.g., similarities between content items within a repository and content items indicated by a user persona according to various modalities of data, etc.) without the need for labeled data. For example, according to some aspects of this disclosure, multimodal content analysis and recommendation module 134 may implement techniques such as auto-encoders, generative adversarial networks (GANs), or variational autoencoders (VAEs).

According to some aspects of this disclosure, method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1-4. However, method 500 is not limited to the aspects of those figures.

In 510, the multimodal content analysis and recommendation module 134 determines (e.g., accesses, receives, retrieves, etc.) content item-related information. According to some aspects of this disclosure, the content item-related information may be textual data, image data, audio data, ancillary content item data, and/or the like to determine and/or predict content items that relate to one or more content items indicated by a user persona. According to some aspects of this disclosure, content item-related information may be used to generate one or more datasets, each dataset associated with a different modality of data.

In 520, multimodal content analysis and recommendation module 134 generates a training dataset and a testing dataset. According to some aspects of this disclosure, the training dataset and the testing dataset may be generated by indicating content items that relate to one or more content items indicated by a user persona. According to some aspects of this disclosure, the training dataset and the testing dataset may be generated by randomly assigning a content item that relates to a query to either the training dataset or the testing dataset. According to some aspects of this disclosure, the assignment of information indicative of content items that relate to one or more content items indicated by a user persona as training or test samples may not be completely random. According to some aspects of this disclosure, only the labeled baseline data for a specific feature extracted from specific content item-related information may be used to generate the training dataset and the testing dataset. According to some aspects of this disclosure, a majority of the labeled baseline data extracted from content item-related information may be used to generate the training dataset. For example, 75% of the labeled baseline data for determining a content item that relates to one or more content items indicated by a user persona extracted from content item-related information and/or related data may be used to generate the training dataset and 25% may be used to generate the testing dataset. Any method or technique may be used to create the training and testing datasets.

In 530, multimodal content analysis and recommendation module 134 determines (e.g., extract, select, etc.) one or more features that can be used by, for example, a classifier (e.g., a software model, a classification layer of a neural network, etc.) to label features extracted from a variety of content item-related information and/or related data. One or more features may comprise indications of content items that relate to one or more content items indicated by a user persona. According to some aspects of this disclosure, the multimodal content analysis and recommendation module 134 may determine a set of training baseline features from the training dataset. Features of content and/or content item data may be determined by any method.

In 540, multimodal content analysis and recommendation module 134 trains one or more machine learning models, for example, using the one or more features. According to some aspects of this disclosure, the machine learning models may be trained using supervised learning. According to some aspects of this disclosure, other machine learning techniques may be employed, including unsupervised learning and semi-supervised. The machine learning models trained in 440 may be selected based on different criteria (e.g., how close a predicted content item that relates to one or more content items indicated by a user persona is to an actual content item that relates to one or more content items indicated by a user persona, etc.) and/or data available in the training dataset. For example, machine learning classifiers can suffer from different degrees of bias. According to some aspects of this disclosure, more than one machine learning model can be trained.

In 550, multimodal content analysis and recommendation module 134 optimizes, improves, and/or cross-validates trained machine learning models. For example, data for training datasets and/or testing datasets may be updated and/or revised to include more labeled data indicating different content items that relate to one or more content items indicated by a user persona.

In 560, multimodal content analysis and recommendation module 134 selects one or more machine learning models to build a predictive model (e.g., a machine learning classifier, a predictive engine, etc.). The predictive model may be evaluated using the testing dataset.

In 570, multimodal content analysis and recommendation module 134 executes the predictive model to analyze the testing dataset and generate classification values and/or predicted values.

In 580, multimodal content analysis and recommendation module 134 evaluates classification values and/or predicted values output by the predictive model to determine whether such values have achieved the desired accuracy level. Performance of the predictive model may be evaluated in a number of ways based on a number of true positives, false positives, true negatives, and/or false negatives classifications of the plurality of data points indicated by the predictive model. For example, the false positives of the predictive model may refer to the number of times the predictive model incorrectly predicted and/or determined a content item that relates to one or more content items indicated by a user persona. Conversely, the false negatives of the predictive model may refer to the number of times the machine learning model predicted and/or determined a content item that relates to one or more content items indicated by a user persona incorrectly, when in fact, the predicted and/or determined a content item that relates to one or more content items indicated by a user persona matches an actual content item that relates to one or more content items indicated by a user persona. True negatives and true positives may refer to the number of times the predictive model correctly predicted and/or determined a content item that relates to one or more content items indicated by a user persona. Related to these measurements are the concepts of recall and precision. Generally, recall refers to a ratio of true positives to a sum of true positives and false negatives, which quantifies the sensitivity of the predictive model. Similarly, precision refers to a ratio of true positives as a sum of true and false positives.

In 590, multimodal content analysis and recommendation module 134 outputs the predictive model (and/or an output of the predictive model). For example, multimodal content analysis and recommendation module 134 may output the predictive model when such a desired accuracy level is reached. An output of the predictive model may end the training phase.

According to some aspects of this disclosure, when the desired accuracy level is not reached, in 590, multimodal content analysis and recommendation module 134 may perform a subsequent iteration of the training method 500 starting at 510 with variations such as, for example, considering a larger collection of content item-related information and/or related data.

FIG. 6 shows a flowchart of an example method 600 for personalized multimodal analysis for content item recommendation, according to some aspects of this disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 1-5. However, method 600 is not limited to the aspects of those figures. A computer-based system (e.g., the multimedia environment 102, the system server(s) 126, etc.) may facilitate personalized multimodal analysis for content item recommendation.

In 602, system server(s) 126 simulates playback of a second content item based on playback behavior associated with playback of a first content item by a user device and an indication that a modality feature of the first content item corresponds to a modality feature of a second content item. System server(s) 126 may determine the playback behavior associated with playback of first content item based on tracked content interaction data associated with a user device. For example, system server(s) 126 may track and/or collect content interaction data for a user device. The content interaction data may indicate how a user device interacts with content items, such as playback of the first content item. System server(s) 126 may generate a content item interaction bot that simulates/mimics actions of the user device, such as playback actions and/or the like, such that at least one playback behavior associated with playback of the second content item matches the playback behavior associated with the playback of a first content item.

In 604, system server(s) 126 identifies an affinity for a modality of different modalities of the second content item. The modality for the second content item may include, but is not limited to, textual modality, visual modality, audio modality, metadata, and/or the like. According to some aspects of this disclosure, system server(s) 126 may identify the affinity for the modality of the second content item based on weights assigned to the different modalities of the second content item according to the simulated playback of the second content item. According to some aspects of this disclosure, system server(s) 126 may identify the affinity for the modality of the second content responsive to validating the second content item. System server(s) 126 may validate the second content item based on an indication that playback behavior indicated by the simulated playback of the second content item corresponds to the playback behavior associated with the playback of the first content item.

In 606, system server(s) 126, for each content item of a plurality of content items of a repository, system server(s) 126 generates a respective similarity score. According to some aspects of this disclosure, system server(s) 126 may generate the respective similarity scores based on a similarity between a vector for an embedding indicative of the modality for the second content item and a respective vector for an embedding indicative of the modality for the second content item generated for the content item input to a predictive model trained to identify the similarity between the embedding indicative of the modality for the second content item and the embedding indicative of the modality for the second content item generated for the content item.

According to some aspects of this disclosure, an example method of training the predictive model may include system server(s) 126 training the predictive model on a first data set comprising labeled data indicating at least one candidate embedding-to-embedding pairing for the modality for the second content item. A set of parameters for predicting modality-to-modality pairings may be generated based on the training. An unlabeled data set for another plurality of content items may be introduced into the predictive model. The set of parameters may be applied to the unlabeled data set, and the predictive model may generate the respective similarity scores based on the applied set of parameters.

In 608, system server(s) 126 identifies a set of content items of the plurality of content items with respective normalized similarity scores that satisfy a similarity score threshold. According to some aspects of this disclosure, system server(s) 126 identifies the set of content items of the plurality of content items with respective normalized similarity scores that satisfy the similarity score threshold based on the respective normalized similarity scores for the plurality of content items.

In 610, system server(s) 126 sends an indication of the set of content items to the user device. According to some aspects of this disclosure, system server(s) 126 sending the indication of the set of content items may include causing the user device to display the indication of the set of content items. According to some aspects of this disclosure, the indication of the set content items may include indications of the set content items arranged according to an order defined by user preferences associated with the user device and/or the respective similarity scores.

According to some aspects of this disclosure, system server(s) 126 may send the user device information including, but not limited to, textual information, audio information, and/or the like that indicates a reason why at least one content item of the set of content items is identified.

Example Computer System

Figure 7:
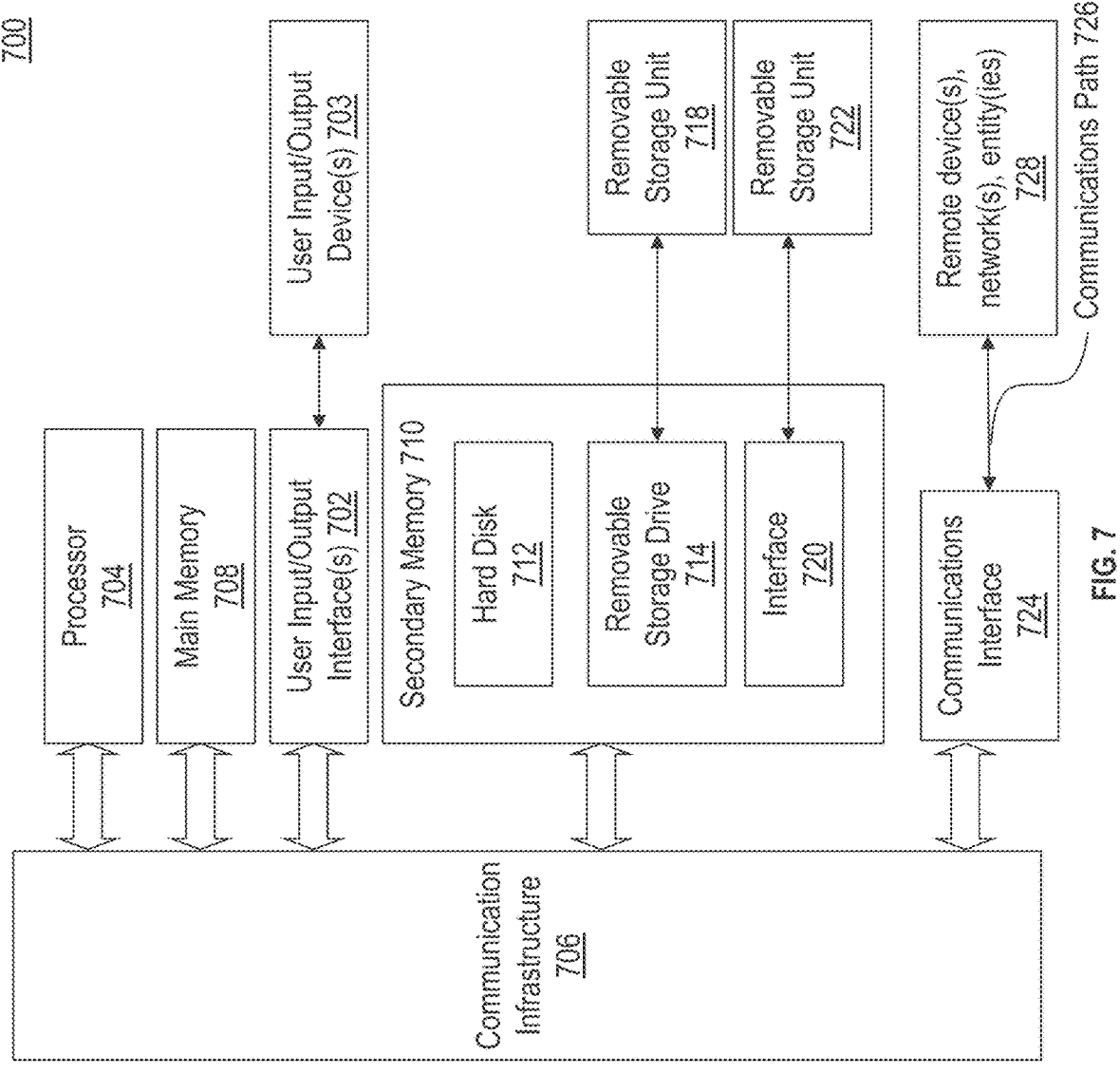
FIG. 7 illustrates an example computer system useful for implementing various embodiments.

Various embodiments may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for personalized multimodal analysis for content item recommendation comprising:

simulating, by at least one computer processor, based on playback behavior associated with playback of a first content item by a user device and an indication that a modality feature of the first content item corresponds to a modality feature of a second content item, playback of the second content item, wherein at least one playback behavior associated with the simulated playback of the second content item matches the playback behavior associated with the playback of the first content item;

identifying, based on weights assigned to different modalities of the second content item according to the simulated playback of the second content item, an affinity for a modality of the different modalities of the second content item;

generating for each content item of a plurality of content items of a repository, based on a similarity between a vector for an embedding indicative of the modality for the second content item and a respective vector for an embedding indicative of the modality for the second content item generated for the content item input to a predictive model trained to identify the similarity between the embedding indicative of the modality for the second content item and the embedding indicative of the modality for the second content item generated for the content item, a respective similarity score;

identifying, based on the respective similarity scores for the plurality of content items, a set of content items of the plurality of content items with respective similarity scores that satisfy a similarity score threshold; and sending an indication of the set of content items to the user device.

2. The computer-implemented method of claim 1, further comprising determining, based on tracked content interaction data associated with the user device, the playback behavior associated with the playback of the first content item.

3. The computer-implemented method of claim 1, further comprising validating, based on an indication that playback behavior indicated by the simulated playback of the second content item corresponds to the playback behavior associated with the playback of the first content item, the second content item, wherein the identifying the affinity for the modality of the second content item is responsive to the validating the second content item.

4. The computer-implemented method of claim 1, further comprising:

training the predictive model on a first data set comprising labeled data indicating at least one candidate embedding-to-embedding pairing for the modality for the second content item;

generating a set of parameters for predicting modality-to-modality pairings based on the training;

introducing an unlabeled data set for another plurality of content items into the predictive model;

applying the set of parameters to the unlabeled data set; and generating the respective similarity scores based on the applied set of parameters.

5. The computer-implemented method of claim 1, wherein the indication of the set of content items comprises indications of the set of content items arranged according to an order defined by user preferences associated with the user device.

6. The computer-implemented method of claim 1, wherein the modality for the second content item comprises at least one of textual modality, visual modality, or audio modality.

7. The computer-implemented method of claim 1, further comprising sending, to the user device, at least one of textual information or audio information that indicates a reason why at least one content item of the set of content items is identified.

8. A system, comprising:

one or more memories; and at least one processor each coupled to at least one of the memories and configured to perform operations for personalized multimodal analysis for content item recommendation, the operations comprising:

simulating, based on playback behavior associated with playback of a first content item by a user device and an indication that a modality feature of the first content item corresponds to a modality feature of a second content item, playback of the second content item, wherein at least one playback behavior associated with the simulated playback of the second content item matches the playback behavior associated with the playback of the first content item;

identifying, based on weights assigned to different modalities of the second content item according to the simulated playback of the second content item, an affinity for a modality of the different modalities of the second content item;

generating for each content item of a plurality of content items of a repository, based on a similarity between a vector for an embedding indicative of the modality for the second content item and a respective vector for an embedding indicative of the modality for the second content item generated for the content item input to a predictive model trained to identify the similarity between the embedding indicative of the modality for the second content item and the embedding indicative of the modality for the second content item generated for the content item, a respective similarity score;

identifying, based on the respective similarity scores for the plurality of content items, a set of content items of the plurality of content items with respective similarity scores that satisfy a similarity score threshold; and sending an indication of the set of content items to the user device.

9. The system of claim 8, the operations further comprising determining, based on tracked content interaction data associated with the user device, the playback behavior associated with the playback of the first content item.

10. The system of claim 8, the operations further comprising validating, based on an indication that playback behavior indicated by the simulated playback of the second content item corresponds to the playback behavior associated with the playback of the first content item, the second content item, wherein the identifying the affinity for the modality of the second content item is responsive to the validating the second content item.

11. The system of claim 8, the operations further comprising:

training the predictive model on a first data set comprising labeled data indicating at least one candidate embedding-to-embedding pairing for the modality for the second content item;

generating a set of parameters for predicting modality-to-modality pairings based on the training;

introducing an unlabeled data set for another plurality of content items into the predictive model;

applying the set of parameters to the unlabeled data set; and generating the respective similarity scores based on the applied set of parameters.

12. The system of claim 8, wherein the indication of the set of content items comprises indications of the set of content items arranged according to an order defined by user preferences associated with the user device.

13. The system of claim 8, wherein the modality for the second content item comprises at least one of textual modality, visual modality, or audio modality.

14. The system of claim 8, the operations further comprising sending, to the user device, at least one of textual information or audio information that indicates a reason why at least one content item of the set of content items is identified.

15. A non-transitory computer-readable medium having instructions stored thereon that, when executed by at least one computing device, cause the at least one computing device to perform operations for personalized multimodal analysis for content item recommendation, the operations comprising:

simulating, based on playback behavior associated with playback of a first content item by a user device and an indication that a modality feature of the first content item corresponds to a modality feature of a second content item, playback of the second content item, wherein at least one playback behavior associated with the simulated playback of the second content item matches the playback behavior associated with the playback of the first content item;

identifying, based on weights assigned to different modalities of the second content item according to the simulated playback of the second content item, an affinity for a modality of the different modalities of the second content item;

generating for each content item of a plurality of content items of a repository, based on a similarity between a vector for an embedding indicative of the modality for the second content item and a respective vector for an embedding indicative of the modality for the second content item generated for the content item input to a predictive model trained to identify the similarity between the embedding indicative of the modality for the second content item and the embedding indicative of the modality for the second content item generated for the content item, a respective similarity score;

identifying, based on the respective similarity scores for the plurality of content items, a set of content items of the plurality of content items with respective similarity scores that satisfy a similarity score threshold; and sending an indication of the set of content items to the user device.

16. The non-transitory computer-readable medium of claim 15, the operations further comprising determining, based on tracked content interaction data associated with the user device, the playback behavior associated with the playback of the first content item.

17. The non-transitory computer-readable medium of claim 15, the operations further comprising validating, based on an indication that playback behavior indicated by the simulated playback of the second content item corresponds to the playback behavior associated with the playback of the first content item, the second content item, wherein the identifying the affinity for the modality of the second content item is responsive to the validating the second content item.

18. The non-transitory computer-readable medium of claim 15, the operations further comprising:

training the predictive model on a first data set comprising labeled data indicating at least one candidate embedding-to-embedding pairing for the modality for the second content item;

generating a set of parameters for predicting modality-to-modality pairings based on the training;

introducing an unlabeled data set for another plurality of content items into the predictive model;

applying the set of parameters to the unlabeled data set; and generating the respective similarity scores based on the applied set of parameters.

19. The non-transitory computer-readable medium of claim 15, wherein the indication of the set of content items comprises indications of the set of content items arranged according to an order defined by user preferences associated with the user device.

20. The non-transitory computer-readable medium of claim 15, wherein the modality for the second content item comprises at least one of textual modality, visual modality, or audio modality.

* * * * *